(12) United States Patent
Phoenix

(10) Patent No.: US 10,649,881 B2
(45) Date of Patent: May 12, 2020

(54) DETERMINING COMPLIANCE OF SOFTWARE APPLICATIONS TO COMPLIANCE STANDARDS BASED ON MAPPED APPLICATION CAPABILITIES

(71) Applicant: VMware, Inc., Palo Alto, CA (US)

(72) Inventor: Carlos Phoenix, Acton, CA (US)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 16/116,245

(22) Filed: Aug. 29, 2018

(65) Prior Publication Data

US 2020/0073782 A1 Mar. 5, 2020

(51) Int. Cl.
*G06F 21/62* (2013.01)
*G06F 9/44* (2018.01)
(Continued)

(52) U.S. Cl.
CPC ............ *G06F 11/3604* (2013.01); *G06F 8/60* (2013.01); *G06F 8/61* (2013.01); *G06F 8/71* (2013.01); *G06F 9/44526* (2013.01); *G06F 21/10* (2013.01); *G06F 21/55* (2013.01); *G06Q 10/06* (2013.01)

(58) Field of Classification Search
CPC .. G06F 9/44526; G06F 9/455; G06F 9/44505; G06F 9/501; G06F 8/61; G06F 8/60; G06F 8/71; G06F 21/55; G06F 21/10; G06F 11/008; H04L 41/16; H04L 41/5003; G06Q 10/06; G06Q 10/0637; G06Q 30/018

See application file for complete search history.

(56) References Cited

U.S. PATENT DOCUMENTS 7,752,125 B1 * 7/2010 Kothari ................. G06Q 20/10
705/38
8,677,315 B1 * 3/2014 Anderson ................ G06F 8/60
717/101

(Continued)

OTHER PUBLICATIONS

Joris Hulstijn et al., Public process management: a method for introducing standard business reporting, Jun. 12-15, 2011, [Retrieved on Dec. 30, 2019]. Retrieved from the internet: <URL: https://dl.acm.org/citation.cfm?id=2037577> 10 Pages (141-150) (Year: 2011).*

(Continued)

*Primary Examiner* — Anibal Rivera

(57) ABSTRACT

The disclosure herein describes determining the compliance of software applications to compliance standards based on capabilities of the software applications. The capabilities of a software application are identified, and the compliance controls of a compliance standard are identified from respective data stores. The capabilities are mapped to the compliance controls based on defined capability map data. Based on at least one capability of the software application being mapped to each compliance control of the compliance standard, a positive compliance indicator is provided, whereby compliance of the software application with the compliance standard is confirmed. The described systems and methods provide efficient means for determining compliance of software applications based on defined capabilities that are abstracted to be comparable to a variety of compliance controls.

20 Claims, 7 Drawing Sheets

(51) Int. Cl.
   *G06F 21/00*   (2013.01)
   *G06Q 10/00*   (2012.01)
   *G06F 11/36*   (2006.01)
   *G06F 21/10*   (2013.01)
   *G06F 21/55*   (2013.01)
   *G06F 8/60*   (2018.01)
   *G06F 8/61*   (2018.01)
   *G06Q 10/06*   (2012.01)
   *G06F 9/445*   (2018.01)
   *G06F 8/71*   (2018.01)

(56) References Cited

U.S. PATENT DOCUMENTS

| | | | | |
|---|---|---|---|---|
| 9,778,930 | B2* | 10/2017 | Dimitrakos | G06F 8/61 |
| 10,007,534 | B2* | 6/2018 | Williams | G06F 9/44526 |
| 2004/0186758 | A1* | 9/2004 | Halac | G06Q 10/06311 |
| | | | | 705/7.18 |
| 2006/0031094 | A1* | 2/2006 | Cohen | G16H 20/10 |
| 2007/0094284 | A1* | 4/2007 | Bradford | G06Q 10/06 |
| 2008/0168135 | A1* | 7/2008 | Redlich | G06Q 10/10 |
| | | | | 709/204 |
| 2009/0119141 | A1* | 5/2009 | McCalmont | G06Q 10/0637 |
| | | | | 705/7.41 |
| 2009/0241165 | A1* | 9/2009 | Tyree | G06F 21/10 |
| | | | | 726/1 |
| 2010/0042451 | A1* | 2/2010 | Howell | G06F 11/008 |
| | | | | 705/7.28 |
| 2014/0337982 | A1* | 11/2014 | Crosby | H04L 63/1433 |
| | | | | 726/25 |
| 2015/0281287 | A1* | 10/2015 | Gill | G06F 21/55 |
| | | | | 726/1 |
| 2016/0139915 | A1* | 5/2016 | Dimitrakos | G06F 8/61 |
| | | | | 717/126 |
| 2016/0139938 | A1* | 5/2016 | Dimitrakos | G06F 9/44505 |
| | | | | 718/100 |
| 2016/0373289 | A1* | 12/2016 | Hernandez | H04L 41/16 |
| 2017/0154189 | A1* | 6/2017 | Betzler | G06F 8/61 |
| 2017/0249644 | A1* | 8/2017 | DiMaggio | G06Q 30/018 |
| 2018/0062941 | A1* | 3/2018 | Brown | H04L 41/5003 |
| 2019/0114435 | A1* | 4/2019 | Bhalla | G06F 21/55 |
| 2019/0163446 | A1* | 5/2019 | Brunel | G06F 8/42 |

OTHER PUBLICATIONS

Jane Cleland-Huang et al., A machine learning approach for tracing regulatory codes to product specific requirements, May 1-8, 2010, [Retrieved on Dec. 30, 2019]. Retrieved from the internet: <URL: https://dl.acm.org/citation.cfm?id=1806825> 10 Pages (155-164) (Year: 2010).*

* cited by examiner

COMPLIANCE DATABASE

SELECT COMPLIANCE DOMAIN:

- ☐ NIST 800-53 HIGH
- ☐ NIST 800-53 MODERATE
- ☐ NIST 800-53 LOW
- ☐ HIPAA
- ☐ GDPR
- ☐ FFIEC
- ☐ GLBA
- ☐ SOX404
- ☐ ISO27001
- ☐ GERMAN BSI IT GRUNDSCHUTZ
- ☐ FEDRAMP
- ☐ FISMA HIGH
- ☐ FISMA MODERATE
- ☐ FISMA LOW
- ☐ SOC2
- ☐ NERC CIP
- ☐ PCI DSS 3.2
- ☐ NIST 800-171
- ☐ NIST CYBERSECURITY FRAMEWORK

PRECISION
- ☐ HIGH PRECISION
- ☐ LOW PRECISION

[ SELECT ALL ]  [ CLEAR ALL ]  [ SUBMIT ]

FIG. 5B

DETERMINING COMPLIANCE OF SOFTWARE APPLICATIONS TO COMPLIANCE STANDARDS BASED ON MAPPED APPLICATION CAPABILITIES

BACKGROUND

Governments and standards organizations have created and continue to create compliance standards and/or regulations that affect and often guide the use of software applications with respect to the treatment of data (e.g., storage of data, transmission of data, availability of data, etc.). Compliance requirements can be vague or specific regarding the precise configurations that are necessary, and it can be challenging to interpret the features of a software application in relation to the requirements of a compliance standard. It is important to determine the compliance of a software application prior to purchase or widespread use of the application in an organization. If non-compliance is discovered later during an audit and it is determined that the application can no longer be used, the money spent on the software, as well as time and effort spent to integrate the software into an enterprise, may have been wasted.

Further, organizations often must ensure that software complies with multiple compliance standards from various sources. Each standard may have been written using different vocabulary or language, complicating the task of determining compliance with each standard. Further, software vendors may struggle to keep up with the many compliance standards that may affect their products, making it difficult for salespeople to provide information and answer questions about compliance issues as they relate to the software products. Determining and maintaining compliance statuses of software applications in the current dynamic, ever-expanding environment of compliance standards presents a substantial challenge for software vendors and users alike.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A computerized method and system for determining compliance of a software application to a compliance standard is described. One or more capabilities associated with the software application are identified in a capability data store and one or more compliance controls of the compliance standard are identified in a compliance control data store. The identified one or more capabilities are mapped to the identified one or more compliance controls based on capability map data in the capability data store. Based on at least one capability of the one or more capabilities being mapped to each compliance control of the one or more compliance controls, a positive compliance indicator is provided, whereby compliance of the software application with the compliance standard is confirmed.

Many of the attendant features will be more readily appreciated as the same becomes better understood by reference to the following detailed description considered in connection with the accompanying drawings.

BRIEF DESCRIPTION OF THE DRAWINGS

The present description will be better understood from the following detailed description read in light of the accompanying drawings, wherein:

FIGS. 5A and 5B are exemplary user interfaces for generating compliance reports on software applications against compliance standards.

Corresponding reference characters indicate corresponding parts throughout the drawings. In FIGS. 1 to 6, the systems are illustrated as schematic drawings. The drawings may not be to scale.

DETAILED DESCRIPTION

Aspects of the disclosure provide a system and method for determining compliance of software applications with compliance standards. The capabilities of a software application are identified in a capability data store and the compliance controls of a compliance standard are identified in a compliance control data store. The identified capabilities are mapped to the identified compliance controls based on capability map data in the capability data store. Based on the capabilities being mapped to the compliance controls, a positive compliance indicator is provided, whereby compliance of the software application with the compliance standard is confirmed. If compliance controls of the compliance standard are not all mapped to at least one capability, a negative compliance indicator is provided, whereby non-compliance of the software application with the compliance standard is confirmed.

The described software compliance system provides users with a single repository to store all information and compliance mappings for use with a defined set of software applications and compliance standards. The repository includes capabilities of each software application and mapping data that indicates how each capability maps to compliance controls of the compliance standards. Users are enabled to use the repository to determine compliance of selected applications with selected compliance standards, the determination resulting in the user receiving indicators of compliance (e.g., compliance reports, etc.). The disclosure operates in an unconventional manner by enabling operators to determine compliance and store compliance data in the central repository, enabling users to use the system to access the determined compliance in an automated way. As such, operation of the disclosure improves the functioning of a computing device by reducing the amount of processing required to determine compliance in response to each request from a user, and improves user interaction with the computing device by readily providing the requested information, reducing human error and subjective manipulation, and saving time (e.g., rather than a manual mapping per regulation).

Figure 1:
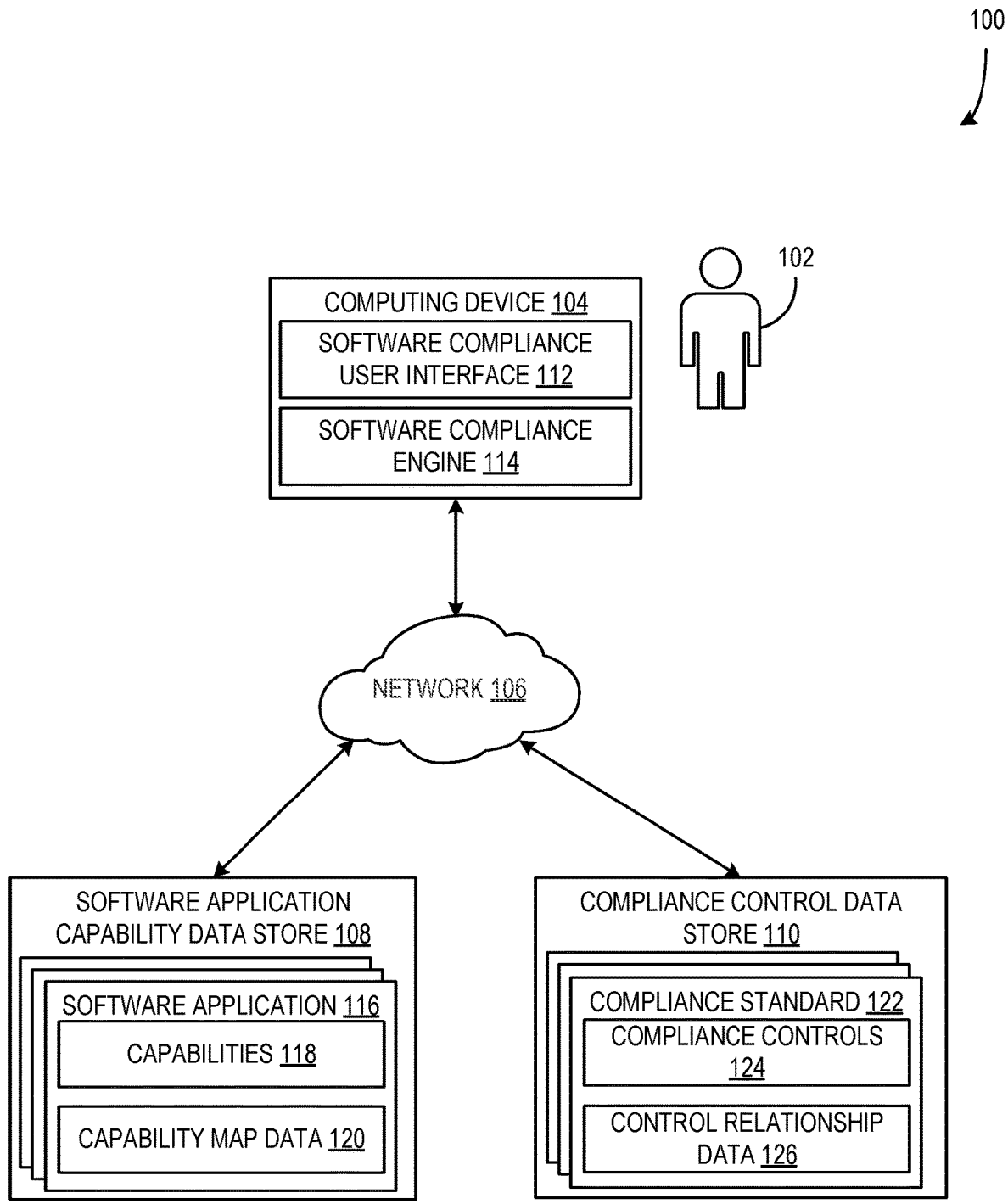
FIG. 1 is an exemplary block diagram illustrating a system configured for determining compliance of software applications with compliance standards according to an embodiment.

FIG. 1 is an exemplary block diagram illustrating a system 100 configured for determining compliance of software applications (e.g., software applications 116, etc.) with compliance standards (e.g., compliance standards 122, etc.) according to an embodiment. The system 100 includes a user 102 and an associated computing device 104, a network 106, a software application capability data store 108, and a compliance control data store 110. The computing device 104 and data stores 108 and 110 are configured to connect to and communicate via the network 106 with each other and/or other devices or entities.

The computing device 104 includes hardware, firmware, and/or software configured to enable the computing device 104 to perform the operations described herein, such as receiving input from the user 102, obtaining data from the data stores 108 and 110, processing data to determine compliance of software applications with compliance standards, and providing output to the user 102. The computing device 104 may be a personal computer, a laptop computer, a tablet, a mobile phone, etc. Further, in some examples, the computing device 104 may include a personal device in the possession of the user 102 in combination with another computing device, such as a server device, such that the functionality of the computing device 104 described herein may be performed by multiple computing devices and/or in a distributed manner.

The computing device is configured to include a software compliance user interface 112 and software compliance engine 114. The user interface 112 and engine 114 include hardware, firmware, and/or software configured to perform the software compliance operations described herein. In some examples, the software compliance user interface 112 includes a graphical user interface (GUI), command line interface (CLI), or other user interface that enables user 102 to select one or more software applications, select one or more compliance standards, and request determinations of the compliance of the selected software applications to the selected compliance standards. Further, the user interface 112 may be configured to transfer user input to the software compliance engine 114 and receive compliance determination output from the software compliance engine 114. The received output may be displayed or otherwise provided to the user 102 via the software compliance user interface 112.

The software compliance engine 114 is configured to receive input from the user interface 112, obtain data from the data stores 108 and 110, and process the obtained data as described herein to determine compliance of software applications with compliance standards. The software compliance engine 114 may further be configured to generate a compliance report (e.g., a spreadsheet) or other output to communicate the results of the compliance determination to the user 102 via the user interface 112. For instance, the software compliance engine 114 may receive a selection of software applications, including associated application identifiers, from the user interface 112 and request application data associated with the selected software applications from the software application capability data store 108. Similarly, the software compliance engine 114 may receive a selection of compliance standards, including associated standard identifiers, from the user interface 112 and request compliance control data associated with the selected compliance standards from the compliance control data store 110. Data obtained based on these requests may be processed as described herein to determine compliance of the software applications with the compliance standards.

The network 106 includes one or more computer networks that are configured to enable network communications between the computing device 104 and data stores 108 and 110. It should be understood that communications between components of the system 100 may be performed using network connections on the network 106 as would be understood by a person of ordinary skill in the art of computer networks and communications. The network 106 may include a plurality of networks (e.g., private intranets, public networks such as the Internet, etc.) and/or network types (e.g., wired networks, wireless networks such as Wi-Fi networks or cellular networks, etc.). The network 106 may include any hardware, firmware, and or software arranged in hierarchies or structures that enable the components of the system 100 to communicate as described without departing from the description herein.

In some examples, the computing device 104 may include the software application capability data store 108 and/or the compliance control data store 110, such that the components included in the computing device 104 do not make use of the network 106 for communication with each other. Further, the components of system 100 may be arranged in other ways that enable the performance of operations as described herein without departing from the description.

The software application capability data store 108 includes hardware, firmware, and/or software for storing software application capability data, responding to requests for data from the software compliance engine 114 and/or other components or devices, and/or performing operations to store and/or update software application capability data based on received requests or instructions from the software compliance engine 114 and/or other components or devices. The application capability data store 108 may be a database, data files, data structure, or another type of data store as would be understood by a person of ordinary skill in the art. In some examples, the data store 108 includes software application data associated with one or more software applications 116. The software application 116 may be identified by a unique application identifier for each software application and may include capabilities 118 and capability map data 120. An exemplary set of software application capability data fields associated with a capability is shown below in Table 1.

TABLE 1

| Data Field | Data Field Description |
| --- | --- |
| Capability_ID | Uniquely identifies a capability |
| Application_ID | Uniquely identifies the software application of the capability |
| Application_Name | Name of the application |
| Application_Version | Identifies the version of the application |
| Capability_Desc | A text field describing the capability |
| Capability_Category | Identifies one or more categories of the capability |

Capabilities 118 include information describing capabilities of the associated software application, including features of the software application and/or operations that may be performed by the application. Capabilities may also be referred to as technology enablement configurations that the software applications supports. For instance, a software application may include one or more capabilities 118 that describe how the application secures and handles user data, how the application communicates with other applications, and/or how the application interacts with users, etc. Capabilities 118 may be defined manually by an engineer or other user with knowledge of the functionality and features of the application. In some examples, capabilities 118 may include the application identifier of the associated software application, a capability identifier specific to the capability, and/or a description of the capability (e.g., a phrase or sentence describing the capability, etc.). Further, capabilities 118 may include other data values, such as keywords (e.g., important terms that may enable groups of capabilities to be searched, etc.), capability categories (e.g., network security capabilities, data encryption capabilities, etc.), and/or software version data (e.g., a capability may be present in some versions of the software application but not others, etc.). Additionally, or alternatively, capabilities 118 may include technical configuration information regarding how to enable, disable, or otherwise make use of the capability. For instance, a capability 118 may enable a user to activate or deactivate security or access settings to comply with different levels of requirements and the data stored with the capability 118 may include information indicating how to activate and/or deactivate the settings (e.g., restricting virtual hosts (e.g., VMWARE® ESXi® hosts) by turning on a "lock down mode" such that settings can only be made by going through a central platform (e.g., VMWARE® vCenter®), etc.). Still further, capabilities 118 may include executable scripts, command line instructions, and/or other executable code that can be executed to implement the capability 118 in the form of system configuration or otherwise adjusted settings of a system (e.g., increasing or hardening the security settings of a system to implement a capability and satisfy defined security requirements, etc.).

Capability map data 120 of a software application 116 defines how capabilities 118 of the application 116 are mapped to compliance controls 124 of compliance standards 122. Mapping associations described in the capability map data 120 for each software application 116 may be defined manually by a user with knowledge of the associated capabilities 118 and compliance controls 124. In some examples, capability map data 120 includes mapping associations between capabilities 118 and compliance controls 124 in the form of rows of a database table (e.g., rows with a capability identifier and a mapped compliance control identifier, etc.). A single capability 118 may be mapped to multiple compliance controls 124 and multiple capabilities 118 may be mapped to a single compliance control 124. Compliance controls 124 are described in greater detail below.

The compliance control data store 110 includes hardware, firmware, and/or software for storing compliance standard data, responding to requests for data from the software compliance engine 114 and/or other components or devices, and/or performing operations to store and/or update software application capability data based on received requests or instructions from the software compliance engine 114 and/or other components or devices. The compliance control data store 110 may be a database, data files, data structures, or another type of data store as would be understood by a person of ordinary skill in the art. In some examples, the compliance control data 110 may comprise a standardized framework into which compliance standards, regulations, and the like are translated and stored (e.g., the Unified Compliance Framework (UCF), etc.). The compliance control data store 110 may store data associated with one or more compliance standards 122, including compliance controls 124 that make up the compliance standards 122 and control relationship data 126 that defines relationships and/or associations among the compliance controls 124.

A compliance standard 122 may be a standard defined by a government entity, regulatory entity, and/or organization of experts in associated fields. For instance, compliance standards may include standards from the National Institute of Standards and Technology (NIST), Defense Information System Agency Security Technical Implementation Guides (DISA STIG), Federal Risk and Authorization Management Program (FedRAMP), the Health Insurance Portability and Accountability Act (HIPAA), the North American Electric Reliability Corporation—Critical Infrastructure Protection Committee (NERC CIP), the Payment Card Industry (PCI), the American Institute of Certified Public Accountants (AICPA), the International Organization of Standardization (ISO), or the General Data Protection Regulation (GDPR). In some examples, compliance standards 122 include text that defines requirements for compliance with the standard. The text of the compliance standard 122 is analyzed manually and/or automatically and divided into a plurality of compliance controls 124. Language analysis algorithms may be used to generate the compliance controls 124 and/or users with knowledge of the compliance standard 122 may define the compliance controls 124. For instance, a user data security compliance standard may include requirements for how user data is stored (e.g., what type of encryption must be used, etc.) and requirements for how user data is transferred over networks (e.g., what type of network connection is trusted, etc.). Each specific requirement in the compliance standard may be used to generate one or more compliance controls 124 in the compliance control data store 110. In an example, a compliance standard 122 may include requirements that the software enable users to sign in with passwords to access user information and that the software stores user information in an encrypted format. These requirements may be used to generate a first compliance control associated with the requirement for users to sign on with passwords and a second compliance control associated with the requirement that user information be stored in an encrypted format.

The control relationship data 126 defines relationships or associations between multiple compliance controls 124. In some examples, the control relationship data 126 includes data values that link the associated compliance control 124 to other compliance controls. For instance, control relationship data 126 associated with a first compliance control 124 may include one or more control identifiers of associated compliance controls.

In some examples, compliance controls may be related in a hierarchical manner (e.g., parent-child relationships or ancestor-descendant relationships, etc.) wherein a more specific compliance control 124 "descends" from a broader compliance control (e.g., a compliance control requiring that user login requires a password that is at least 8 characters long descends from a compliance control requiring that user login requires a password generally, etc.). Such hierarchical control relationships may be defined such that, when a software application complies with a first compliance control, the software application also complies with the compliance controls from which the first compliance control descends.

In some examples, the control relationship data 126 may take the form of a "genealogy value" (e.g., genealogy value or sort ID from the UCF, etc.) that identifies one or more compliance controls from which the associated compliance control descends (e.g., a genealogy value that includes identifiers for a line of compliance controls from which a compliance control descends, etc.). The genealogy value may be truncated to reduce the amount of data stored for each compliance control (e.g. the genealogy value includes identifiers for the four closest ancestor compliance controls, etc.). In this way, the control relationship data 126 acts as metadata describing a control, including category and context for example, to find other controls that might be similar to the control.

In other examples, control relationship data 126 may define relationships between compliance controls 124 in different structures or hierarchies. For instance, control relationship data 126 may include categories of compliance controls 124.

Figure 2:
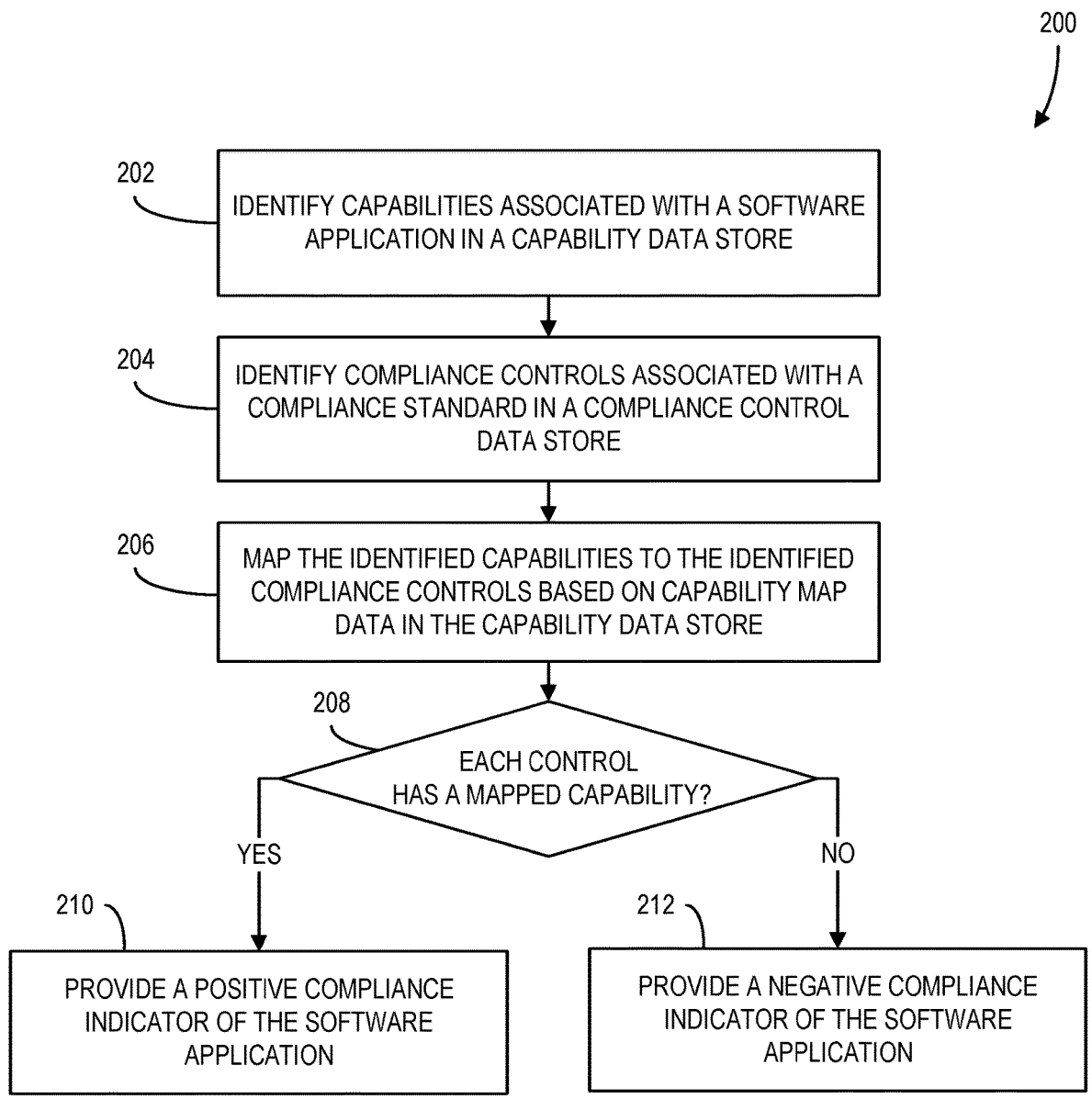
FIG. 2 is an exemplary flow chart illustrating a process of determining compliance of a software application with a compliance standard according to an embodiment.

FIG. 2 is an exemplary flow chart 200 illustrating a process of determining compliance of a software application with a compliance standard according to an embodiment. The operations of flow chart 200 may be performed by a system (e.g., system 100, etc.) including a software compliance engine (e.g., software compliance engine 114, etc.) and data stores (e.g., software application capability data store 108 and compliance control data store 110, etc.) as described herein. At 202, one or more capabilities associated with a software application are identified in a capability data store. The software application may have been selected by a user via a user interface (e.g., user interface 112, etc.) for compliance determination. Identifying the one or more capabilities of the software application may include a software compliance engine 114 requesting the one or more capabilities from the capability data store 108 via network communication on a network 106.

At 204, one or more compliance controls associated with a compliance standard are identified in a compliance control data store. As with the software application, the compliance standard may have been selected by a user via a user interface (e.g., user interface 112, etc.) for use in compliance determination. Identifying the one or more compliance controls of the compliance standard may include a software compliance engine 114 requesting the one or more compliance controls from the compliance control data store 110 via network communication on a network 106.

At 206, the one or more capabilities are mapped to the one or more compliance controls based on capability map data in the capability data store. The capability map data may be requested and received by the software compliance engine 114 with the capability data or it may be requested and received separately from the capability data. The capability map data includes the mapping associations between capabilities of the software application and compliance controls of the compliance data store as described above. Mapping the capabilities to the compliance controls may include searching through the capability map data for each capability, identifying each compliance control with which the capability complies, and storing the determined compliance for use as compliance determination output. Alternatively, or additionally, mapping may include searching through or otherwise querying the capability map data for each compliance control of the compliance standard, identifying each capability of the software application that complies with each compliance control, and storing the determined compliance for use as compliance determination output.

In some examples, multiple capabilities of the software application enable compliance with a particular compliance control. Once the mapping process identifies the first capability that maps to the compliance control, the process may refrain from identifying additional capabilities that may enable compliance with the compliance control to reduce the time and/or processing resources necessary to complete the mapping process. Alternatively, the mapping process may identify all capabilities of the software application that enable compliance with a compliance control to provide comprehensive compliance information with any provided compliance indicators.

In some examples, mapping capabilities to compliance controls may include mapping capabilities to compliance controls that are related to already-mapped compliance controls based on control relationship data (e.g., control relationship data 126, etc.). The process of mapping capabilities to compliance controls based on control relationship data is described in greater detail below with respect to FIG. 3.

At 208, if each compliance control has a mapped capability after the mapping process is complete, a positive compliance indicator of the software application is provided at 210. Alternatively, if each compliance control does not have at least one mapped capability after the mapping process is complete, a negative compliance indicator of the software application is provided at 212.

The positive and negative compliance indicators may be data that is sent to a user interface (e.g., user interface 112, etc.) for display to a user (e.g., user 102, etc.). For instance, a user may have selected the software application and compliance standard on the user interface and, upon the mapping process being completed, the user interface displays that the software application complies (e.g., a positive compliance indicator, etc.) or that the software application does not comply (e.g., a negative compliance indicator, etc.). Alternatively, or additionally, compliance indicators may be provided in the form of a compliance report as described below with respect to FIG. 3.

In some examples, the identified capabilities of the software application may include capability data associated with multiple versions of the software application. The mapping process may be performed based on the capabilities of each version of the software application, such that separate compliance indicators may be provided for each version of the software application (e.g., version 1 of an application may not comply, while version 2 may include additional features to enable compliance, etc.). Such differences in compliance may further be described in a compliance report or related compliance output as described herein.

Figure 3:
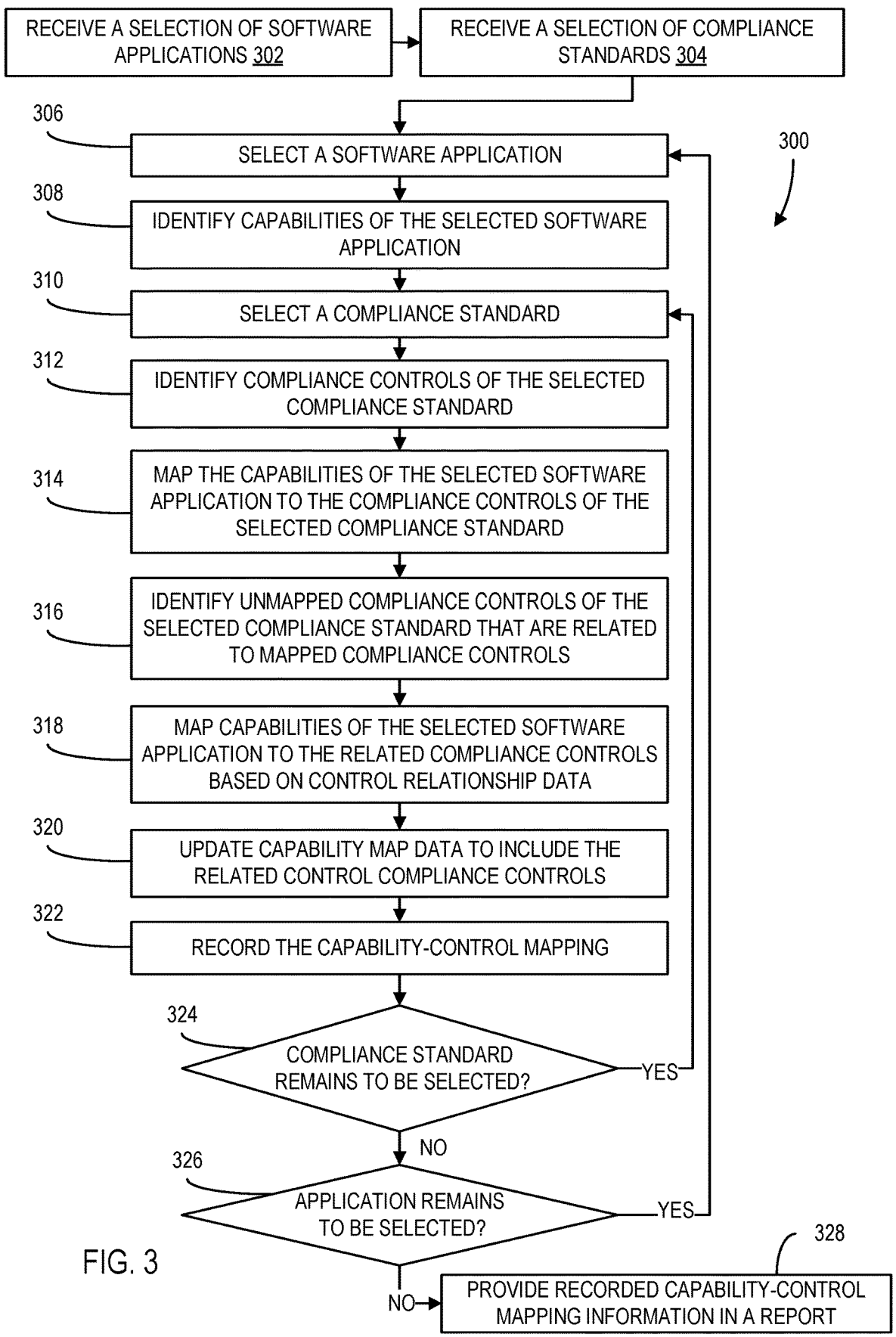
FIG. 3 is an exemplary flow chart illustrating a process of determining compliance of a plurality of software applications with a plurality of compliance standards, including consideration of relationships between compliance controls, according to an embodiment.

FIG. 3 is an exemplary flow chart 300 illustrating a process of determining compliance of a plurality of software applications with a plurality of compliance standards, including consideration of relationships between compliance controls, according to an embodiment. The operations of flow chart 300 may be performed by a system (e.g., system 100, etc.) including a software compliance engine (e.g., software compliance engine 114, etc.) and data stores (e.g., software application capability data store 108 and compliance control data store 110, etc.) as described herein. At 302, a selection of a plurality of software applications is received. The selection may be received by a software compliance engine from a user interface (e.g., software compliance user interface 112, etc.). For instance, the user interface 112 may include a GUI that displays a list or other grouping of software applications that may potentially selected. The GUI may further enable a user (e.g., user 102, etc.) to interact with the interface to select one or more of the available software applications (e.g., by highlighting applications in a list, activating buttons or checkboxes, typing in names or identifiers of applications, etc.). Alternatively, or additionally, the user interface 112 may include a CLI or other interface that enables the user to select software applications. Further, selections of software applications may be received via an application programming interface (API) associated with the software compliance engine and exposed for use by other applications (e.g., a web server that serves a website for displaying application information via a web browser may access the compliance engine via an API to obtain and display compliance information associated with software applications, etc.).

At 304, a selection of a plurality of compliance standards is received. As with the selection of software applications described above, the selection may be received by a software compliance engine from a user interface, GUI, CLI, API, and/or other interfaces.

At 306, a software application is selected from the plurality of software applications. The software compliance engine may be configured to select and evaluate each software application of the plurality of software applications in a sequence or series, iterating through each selected software application to determine compliance with the selected compliance standards.

At 308, the capabilities of the selected software application are identified. Identifying the capabilities may be performed substantially as described above with respect to 202 of FIG. 2.

At 310, a compliance standard is selected from the plurality of compliance standards. As with selecting the software application above at 306, the software compliance engine may be configured to select and evaluate each compliance standard of the plurality of compliance standards with respect to the selected software application in a sequence or series.

At 312, the compliance controls of the selected compliance standard are identified. Identifying the compliance controls may be performed substantially as described above with respect to 204 of FIG. 2.

At 314, as at 206 of FIG. 2 above, the capabilities of the selected software application are mapped to the compliance controls of the selected compliance standard. In some examples, the mapping is based on the capability map data (e.g., capability map data 120, etc.) associated with the software application as described herein. At 316, after all capabilities have been mapped to compliance controls based on the capability map data, unmapped compliance controls that are related to mapped compliance controls based on control relationship data (e.g., control relationship data 126, etc.) are identified. The identification of related compliance controls may include accessing control relationship data that has previously been received from a compliance control data store with other compliance control data. Alternatively, the identification may include requesting control relationship data associates with unmapped compliance controls and/or other compliance controls upon determining that a portion of the compliance controls of the selected compliance standard remain unmapped. In some examples, if all the compliance controls have been mapped to capabilities of the software application, the processes of 316-320 may not be performed by the software compliance engine due to the lack of unmapped compliance controls for the selected compliance standard.

At 318, capabilities of the selected software application are mapped to the previously-unmapped compliance controls, identified at 316, based on the control relationship data. In some examples, capabilities may be mapped to compliance controls that are related to compliance controls to which the capabilities are already mapped. For instance, a first compliance control and a second compliance control may be related based on control relationship data and a capability may have been previously mapped to the first control. As a result of the identified relationship between the first compliance control and the second compliance control, the capability may be mapped to the second compliance control as well.

In further examples, where the control relationship data defines compliance control hierarchies of ancestor-descendant control relationships as described herein, a capability that is mapped to a first compliance control may be mapped to each of the ancestor compliance controls of the first compliance control based on the relationship data. However, the capability may not be mapped to descendant compliance controls of the first compliance control, as descendant compliance controls may include more strict or narrow requirements with which the capability may fail to comply. In such examples, when compliance of a capability with a compliance control is possible based on compliance relationship data but uncertain, data associated with the possible compliance may be recorded and later provided in a compliance report or the like for consideration by a user (e.g., the uncertain capability-compliance control relationship may be highlighted to the user such that the user is enabled to make a decision regarding whether the capability should be considered to comply with the highlighted compliance control, etc.).

At 320, the mappings of capabilities to the compliance controls based on control relationship data at 318 are used to update the capability map data associated with the software application (e.g., capability map data 120 of software application 116, etc.). The update may include transmitting update instructions including the mapping data to the software application capability data store (e.g., data store 108, etc.). After the update, the capability map data of the data store reflects the mapping relationship between the capabilities and the newly-mapped compliance controls such that, during future mapping processes, the capabilities will be mapped to the compliance controls on the first pass based on the capability map data, rather than on the second pass based on the control relationship data as described herein.

At 322, the capability-control mapping data from the mappings at 314 and 318 are recorded. The recorded capability-control mapping data may be used in determination of compliance of the selected software application to the selected compliance standard and in displaying or otherwise providing compliance information to a user as described herein. The recorded capability-control mapping data may include mapping relationships between the capabilities and compliance controls as well as compliance controls of the selected compliance standard that have not been mapped to any capability of the selected software application. The presence of such unmapped compliance controls may indicate that the selected software application does not comply with the selected compliance standard.

At 324, if one or more compliance standards of the plurality of compliance standards remains to be selected, the process returns to 310 to continue mapping the capabilities of the selected software application to the compliance controls of the next compliance standard. Alternatively, if no more compliance standards remain to be selected, the process proceeds to 326.

At 326, if one or more software applications of the plurality of software applications remains to be selected, the process returns to 306 to perform mapping of the capabilities of the next selected software application to the compliance controls of the plurality of compliance standards. Alternatively, if no software applications remain to be selected, the process proceeds to 328.

It should be understood that, while the flow chart 300 describes evaluating software applications and compliance standards in nested sequences (e.g., evaluating each software application against all compliance standards in sequence, etc.), in an alternative example, the nested sequences may be reversed (e.g., each compliance standard may be evaluated against all software applications in sequence, etc.) without departing from the description herein.

At 328, the recorded capability-control mapping information is provided in a report. The compliance report may be provided to a user via a user interface (e.g., GUI, CLI, etc.), in the form of a document file or the like, or to another device and/or application via an API. The compliance report may include positive and/or negative compliance indicators for each software application-compliance standard pairing. In further examples, the compliance report may include more detailed compliance information regarding specific capabilities and/or compliance controls. For instance, the report may include lists of specific capability-control mappings, identification of compliance controls with which software applications did not comply, uncertain mappings based on control relationship data as described above, etc.

In some examples, the compliance report may include procedures or guidance information that may instruct a user to perform technical configuration to enable and/or disable a capability (e.g., based on the information associated with a capability 118 as described above). Such information may include links to websites, web portals, or other external data stores that describe in-depth procedures and/or scripts, commands, or other executable code for implementing the capability. The report may be configured such that, when the report is loaded into another application, such as a tool for deploying associated software, the report may be used to apply configuration settings associated with the capabilities of the report to a baseline installation of the associated software. Further, after the software associated with a report has been implemented on a system, the report may be used as a baseline report that is used to verify that the desired configuration is in place and, if it is determined that the desired configuration is not in place (e.g., based on changes to the installed software and/or changes to associated compliance standards, often referred to as Compliance Drift), the report may be used as a guide to determine and apply necessary configuration changes.

Figure 4:
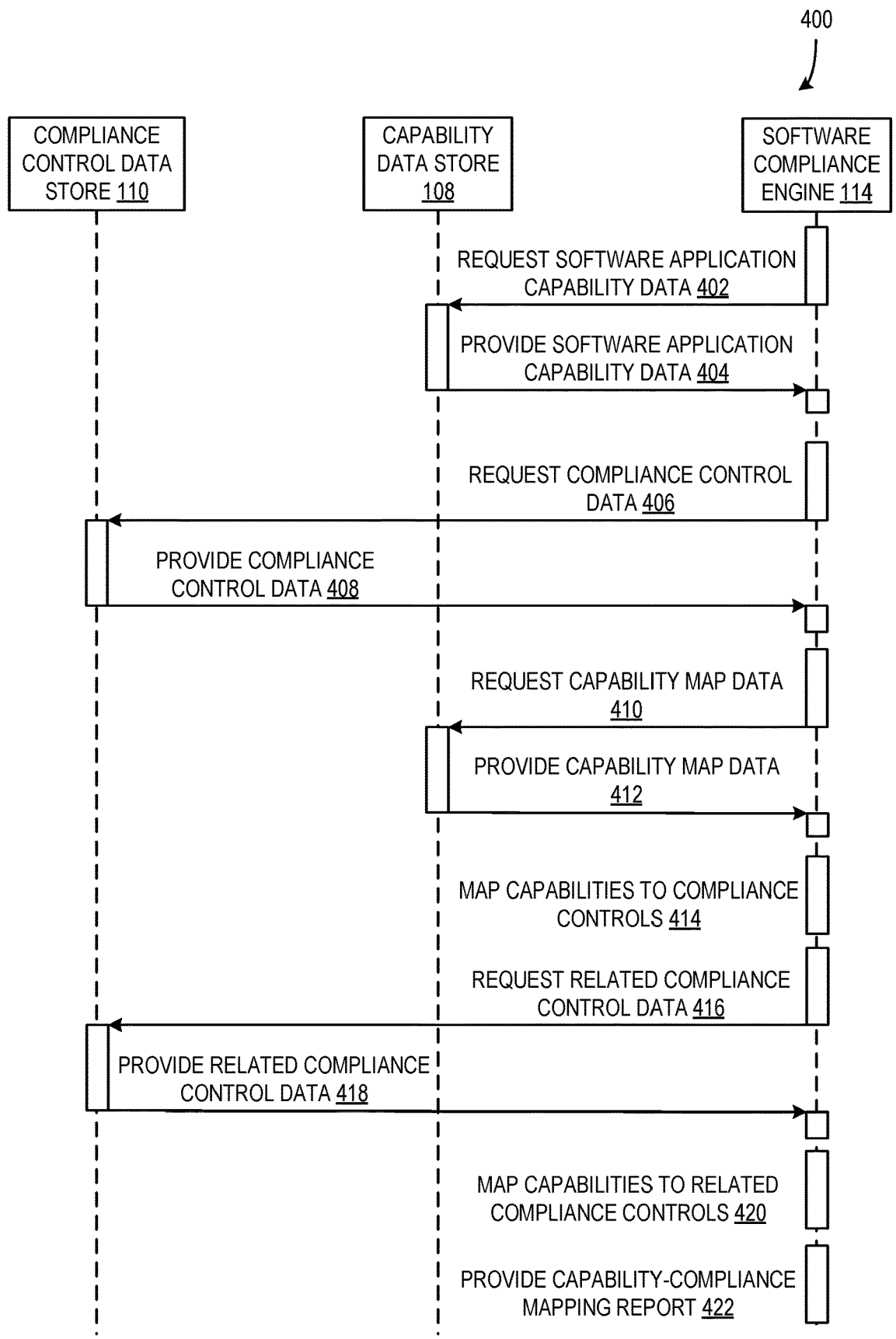
FIG. 4 is an exemplary sequence diagram illustrating a process of determining compliance of a plurality of software applications with a plurality of compliance standards according to an embodiment.

FIG. 4 is an exemplary sequence diagram 400 illustrating a process of determining compliance of a plurality of software applications with a plurality of compliance standards according to an embodiment. The operations of sequence diagram 400 may be performed by a system (e.g., system 100, etc.) including a software compliance engine (e.g., software compliance engine 114, etc.) and data stores (e.g., software application capability data store 108 and compliance control data store 110, etc.) as described herein. Further, the interactions between the entities of the sequence diagram 400 may be a result of performance of the operations described above with respect to flow chart 300 of FIG. 3. At 402, the software compliance engine 114 requests software application capability data from the capability data store 108. In response to the request, the capability data store 108 sends the software application capability data to the software compliance engine 114.

It should be understood that communications between the software compliance engine 114, capability data store 108, and compliance control data store 110 may be enabled by network connections over a network (e.g., network 106, etc.) as described above. Alternatively, or additionally, the software compliance engine 114 may be disposed in the same computing device as one or both of the data stores 108 and 110, such that communications may be via internal communication buses or other channels of the shared computing device.

At 406, the software compliance engine 114 requests compliance control data from the compliance control data store 110 and, at 408, the compliance control data store 110 provides the requested compliance control data in response to the request.

At 410, the software compliance engine 114 requests capability map data from the capability data store 108 and, at 412, the capability data store 108 provides the capability map data to the software compliance engine 114 in response to the request. It should be understood that the requests at 402, 406, and 410 may be sent in other orders and/or at substantially simultaneous times. Further, responses to the requests may be received in other orders without departing from the description. For instance, the requests at 402 and 410 for software capability data and capability map data may be sent substantially simultaneously to the capability data store 108.

At 414, the software compliance engine 114 maps the capabilities of the software application to the compliance controls received from the compliance control data store 110. The mapping process may be performed as described above with respect to FIGS. 2 and/or 3. After mapping, at 416, the software compliance engine 114 requests related compliance control data from the compliance control data store 110. The related compliance control data requested may include compliance controls that are related to the previously-mapped compliance controls as described above. At 418, the compliance control data store 110 provides the requested related compliance control data in response to the request.

At 420, the capabilities of the software application are mapped to the related compliance controls as described above. When all the capability-compliance control mapping is complete, a capability-compliance mapping report is provided at 422, as described above with respect to 328 of FIG. 3.

Figure 5A:
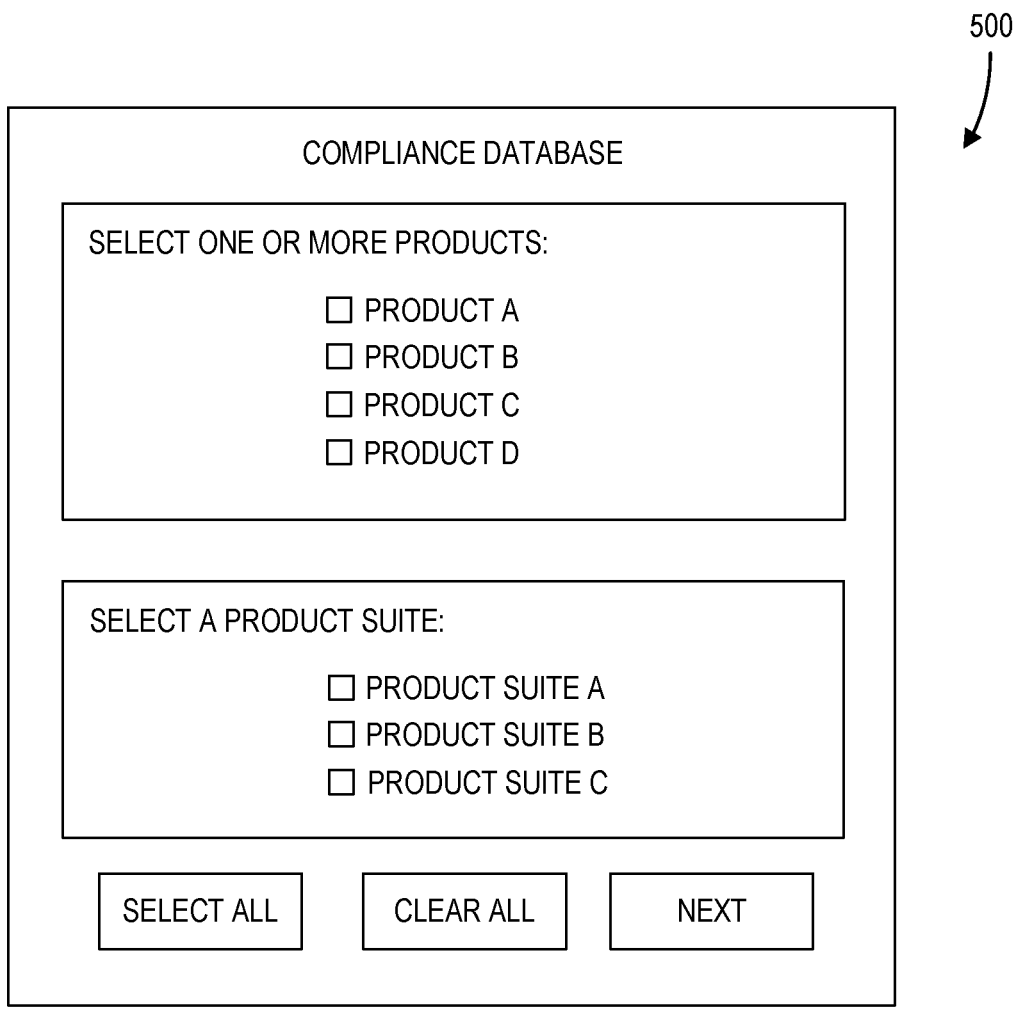

Referring next to FIGS. 5A and 5B, exemplary user interfaces 500, 501 for generating compliance reports on software applications against compliance standards are illustrated. The user interfaces 500, 501 are examples of the software compliance user interface 112. In user interface 500, the user 102 selects the software application(s) 116. In this example, Products A, B, C, and D are shown, although more or fewer products are within the scope of the disclosure. Alternatively or in addition, the user 102 is able to select a product suite. In this example, Product Suites A, B, and C are shown, although more or fewer products are within the scope of the disclosure. After selecting the software application(s) 116, the user 102 is presented with the user interface 501.

In user interface 501, the user 102 selects the compliance standard 122 (referred to as compliance domains in FIG. 5B). In this example, various compliance domains are illustrated, although more or fewer compliance domains are within the scope of the disclosure.

The user 102 is also able to select the level of precision for the report. In this example, the user selects high or low precision. High precision refers to more exact matches (and hence fewer matches), while low precision refers to less exact matches (and hence additional matches that may be false positives). For example, for a high precision search, the control identifiers are identical.

When performing a low precision search, the software compliance engine 114 may use the control relationship data 126 to identify additional possible matches (e.g., using the truncated sort ID, control impact zone, or the like).

After submitting the selection, the software compliance engine 114 generates the report and presents the generated report to the user 102.

Additional Example Scenarios

Aspects of the disclosure enable various additional scenarios, such as next described.

In an example, a user is considering the use of a software application and wants to determine if the application is compatible with a user data security regulation that has been implemented in the US, where the user plans to use the software application. The user runs a software compliance application including a software compliance user interface and software compliance engine as described herein. The user selects the software application of interest from a list of available software applications and then selects the US user data security regulation from a list of available compliance standards. The user then activates a button on the user interface to cause the software compliance engine to determine compliance of the selected software application with the selected regulation. The compliance engine performs a compliance determination as described herein by comparing the capabilities of the selected software application to the compliance controls of the selected regulation and determining whether at least one capability has been mapped to each of the compliance controls. In this case, the software compliance engine determines that the selected application does comply with the selected regulation and the compliance user interface displays a positive compliance indicator to the user in the form of a green checkmark next to the selected software application and regulation combination.

In a related example, the user may further be provided the ability to view a compliance report associated with the positive compliance indicator. If the user selects to view the compliance report, it may be displayed to the user, showing the capability-control mappings in order to indicate features of the software application that are used to show compliance.

In another example, the software application is found to not comply with the selected regulation, such that a negative compliance indicator is provided to the user in the form of a red "X" next to the selected application and regulation combination. A compliance report may further be provided that shows the user which compliance controls are not complied with by the software application.

In yet another example, a user is considering the use of three different software applications and wants to determine if the applications are compatible with user data security regulations that have been implemented in the US and in Europe, as well as a data encryption standard that is recommended by a group of encryption experts. The user runs a software compliance application including a software compliance user interface and software compliance engine as described herein. The user selects each of the three different software applications from a list of available software applications by activating checkboxes next to the desired applications. Then, the user selects the user data security regulations and the data encryption standard from a list of available compliance standards by activating checkboxes next to the desired standards. The user activates a "determine compliance" button on the user interface, causing the software compliance engine to determine compliance of each of the three selected software applications with each of the three selected compliance standards as described herein. The engine determines that two of the three software applications comply with all three of the selected compliance standards, while the third software application complies with only the data encryption standard and not the user data security regulations. The user is provided with a compliance report indicating the results of the compliance determination and highlighting compliance controls that were not complied with by the third software application.

In another example, an external auditor reviews the matches from the low precision searches, and then adds correctly-matched control identifiers from these searches to the database to improve the high precision matching such that, over time, the low precision searches yield fewer matches (e.g., because the high precision searches now catch those matches).

In another example, an external audit of a system is approaching and a user of the system wants to be sure that the system complies with associated standards. The user selects to view a compliance report generated for the system, using the present disclosure. The report includes instructions that guide the user through a checklist of the installed software on the system to ensure that all installed configurations and/or capabilities are correctly aligned to the associated compliance standards prior to the audit.

In yet another example, an application or associated capability of a system is found to be broken and a support system is contacted. The support system imports a compliance report associated with the system to check technical configurations and capabilities that are in place in the system, using the present disclosure. The support system analyzes the configuration of the system based on the compliance report to identify which application or configuration setting may have caused the capability of the system to be broken. Once identified, the support system may take steps to correct the issue or otherwise instruct a user of the system to correct the issue.

In yet another example, a software vendor wants to understand how their offered services and/or applications can be used in an environment that includes substantial compliance requirements. The vendor can obtain a compliance report that includes information about the compliance requirements in the environment, including their current compliance based on their use of applications or capabilities that have already been mapped, using the present disclosure. Further, the vendor may use the report to identify any gaps in compliance and as a guide to notate their own offerings with respect to the compliance requirements, such that the vendor is able to provide compliance information to their customers.

Exemplary Operating Environment

Figure 6:
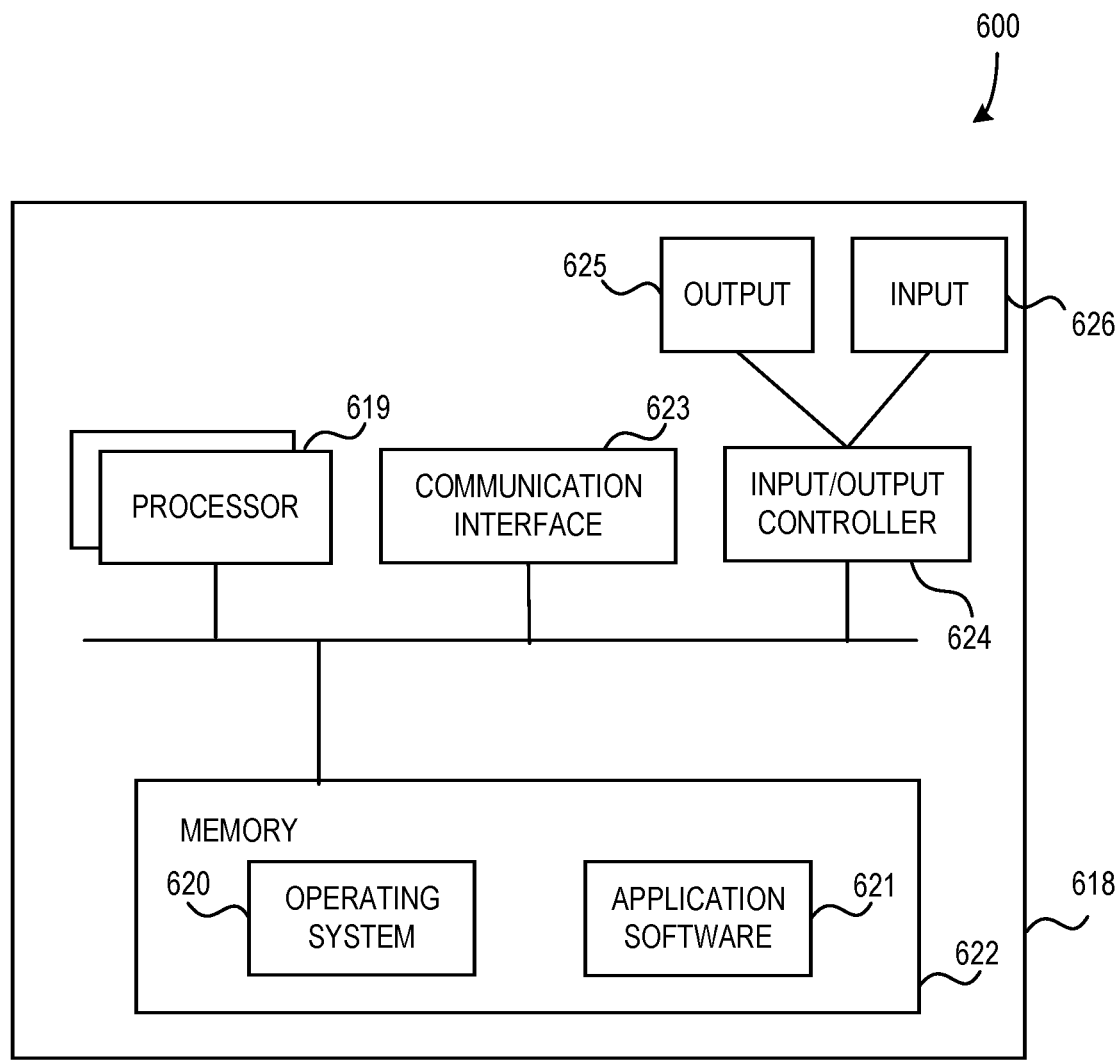
FIG. 6 illustrates a computing apparatus according to an embodiment as a functional block diagram.

The present disclosure is operable with a computing apparatus according to an embodiment as a functional block diagram 600 in FIG. 6. In an embodiment, components of a computing apparatus 618 may be implemented as a part of an electronic device according to one or more embodiments described in this specification. The computing apparatus 618 comprises one or more processors 619 which may be microprocessors, controllers or any other suitable type of processors for processing computer executable instructions to control the operation of the electronic device. Platform software comprising an operating system 620 or any other suitable platform software may be provided on the apparatus 618 to enable application software 621 to be executed on the device. According to an embodiment, determining compliance of a software application with a compliance standard based on capabilities of the software application as described herein may be accomplished by software.

Computer executable instructions may be provided using any computer-readable media that are accessible by the computing apparatus 618. Computer-readable media may include, for example, computer storage media such as a memory 622 and communications media. Computer storage media, such as a memory 622, include volatile and non-volatile, removable and non-removable media implemented in any method or technology for storage of information such as computer readable instructions, data structures, program modules or the like. Computer storage media include, but are not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing apparatus. In contrast, communication media may embody computer readable instructions, data structures, program modules, or the like in a modulated data signal, such as a carrier wave, or other transport mechanism. As defined herein, computer storage media do not include communication media. Therefore, a computer storage medium should not be interpreted to be a propagating signal per se. Propagated signals per se are not examples of computer storage media. Although the computer storage medium (the memory 622) is shown within the computing apparatus 618, it will be appreciated by a person skilled in the art, that the storage may be distributed or located remotely and accessed via a network or other communication link (e.g. using a communication interface 623).

The computing apparatus 618 may comprise an input/output controller 624 configured to output information to one or more output devices 625, for example a display or a speaker, which may be separate from or integral to the electronic device. The input/output controller 624 may also be configured to receive and process an input from one or more input devices 626, for example, a keyboard, a microphone or a touchpad. In one embodiment, the output device 625 may also act as the input device. An example of such a device may be a touch sensitive display. The input/output controller 624 may also output data to devices other than the output device, e.g. a locally connected printing device. In some embodiments, a user may provide input to the input device(s) 626 and/or receive output from the output device (s) 625.

The functionality described herein can be performed, at least in part, by one or more hardware logic components. According to an embodiment, the computing apparatus 618 is configured by the program code when executed by the processor 619 to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Program-specific Standard Products (ASSPs), System-on-a-chip systems (SOCs), Complex Programmable Logic Devices (CPLDs), Graphics Processing Units (GPUs).

At least a portion of the functionality of the various elements in the figures may be performed by other elements in the figures, or an entity (e.g., processor, web service, server, application program, computing device, etc.) not shown in the figures.

Although described in connection with an exemplary computing system environment, examples of the disclosure are capable of implementation with numerous other general purpose or special purpose computing system environments, configurations, or devices.

Examples of well-known computing systems, environments, and/or configurations that may be suitable for use with aspects of the disclosure include, but are not limited to, mobile or portable computing devices (e.g., smartphones), personal computers, server computers, hand-held (e.g., tablet) or laptop devices, multiprocessor systems, gaming consoles or controllers, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. In general, the disclosure is operable with any device with processing capability such that it can execute instructions such as those described herein. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein.

In examples involving a general-purpose computer, aspects of the disclosure transform the general-purpose computer into a special-purpose computing device when configured to execute the instructions described herein.

Alternatively, or in addition to the other examples described herein, examples include any combination of the following:

A system for determining compliance of software applications to compliance standards comprising:
at least one processor; and
at least one memory comprising computer program code, the at least one memory and the computer program code configured to, with the at least one processor, cause the at least one processor to:
identify one or more capabilities associated with a software application in a capability data store;
identify one or more compliance controls associated with a compliance standard in a compliance control data store;
map the identified one or more capabilities to the identified one or more compliance controls based on capability map data in the capability data store; and
based on the one or more capabilities being mapped to the one or more compliance controls, provide a positive compliance indicator, whereby compliance of the software application with the compliance standard is confirmed.

17 wherein mapping the identified one or more capabilities to the identified one or more compliance controls based on capability map data further includes:
identifying a first compliance control of the one or more compliance controls that is related to a second compliance control of the one or more compliance controls based on control relationship data in the compliance control data store, wherein the second compliance control has been mapped to at least one capability of the one or more capabilities; and
mapping the first compliance control to the at least one capability to which the second compliance control is mapped based on the control relationship data.
wherein the control relationship data indicates the first compliance control and second compliance control have a parent-child relationship indicating that compliance with the second compliance control necessarily indicates compliance with the first compliance control.
wherein, based on the first compliance control being mapped to the at least one capability based on the control relationship data, update the capability map data of the at least one capability to include a mapping to the first compliance control.
wherein the control relationship data includes at least one of a truncated sort ID or a truncated genealogy value.
wherein the at least one memory and the computer program code is configured to, with the at least one processor, further cause the at least one processor to:
based on at least one compliance control of the one or more compliance controls failing to be mapped to at least one capability of the one or more capabilities, provide a negative compliance indicator, whereby non-compliance of the software application with the compliance standard is confirmed.
wherein providing a positive compliance indicator and providing a negative compliance indicator include providing a compliance report, the compliance report including at least one first list of compliance controls with which the software application complies and at least one second list of compliance controls with which the software application does not comply.
wherein identifying one or more capabilities associated with a software application in a capability data store includes identifying one or more capabilities associated with a plurality of versions of the software application; and
wherein providing a positive compliance indicator includes providing a positive compliance indicator for each version of the plurality of versions of the software application that complies with the compliance standard.
wherein the at least one memory and the computer program code is configured to, with the at least one processor, further cause the at least one processor to:
receive, via a user interface, a selection of the software application from a plurality of software applications and a selection of the compliance standard from a plurality of compliance standards;
wherein identifying the one or more capabilities is based on the received selection of the software application; and
wherein identifying the one or more compliance controls is based on the received selection of the compliance standard.
A computerized method for determining compliance of software applications to compliance standards, the method comprising:

18 identifying, by a processor, one or more capabilities associated with a software application in a capability data store;
identifying, by the processor, one or more compliance controls associated with a compliance standard in a compliance control data store;
mapping, by the processor, the identified one or more capabilities to the identified one or more compliance controls based on capability map data in the capability data store; and
based on the one or more capabilities being mapped to the one or more compliance controls, providing, by the processor, a positive compliance indicator, whereby compliance of the software application with the compliance standard is confirmed.
wherein mapping the identified one or more capabilities to the identified one or more compliance controls based on capability map data further includes:
identifying a first compliance control of the one or more compliance controls that is related to a second compliance control of the one or more compliance controls based on control relationship data in the compliance control data store, wherein the second compliance control has been mapped to at least one capability of the one or more capabilities; and
mapping the first compliance control to the at least one capability to which the second compliance control is mapped based on the control relationship data.
wherein the control relationship data indicates the first compliance control and second compliance control have a parent-child relationship indicating that software applications that are compliant with the second compliance control are compliant with the first compliance control.
wherein, based on the first compliance control being mapped to the at least one capability based on the control relationship data, update the capability map data of the at least one capability to include a mapping to the first compliance control.
wherein the control relationship data includes at least one of a truncated sort ID or a truncated genealogy value.
further comprising, based on at least one compliance control of the one or more compliance controls failing to be mapped to at least one capability of the one or more capabilities, providing, by the processor, a negative compliance indicator, whereby non-compliance of the software application with the compliance standard is confirmed.
wherein providing a positive compliance indicator and providing a negative compliance indicator include providing a compliance report, the compliance report including at least one first list of compliance controls with which the software application complies and at least one second list of compliance controls with which the software application does not comply.
wherein identifying one or more capabilities associated with a software application in a capability data store includes identifying one or more capabilities associated with a plurality of versions of the software application; and
wherein providing a positive compliance indicator includes providing a positive compliance indicator for each version of the plurality of versions of the software application that complies with the compliance standard.
further comprising receiving, via a user interface, a selection of the software application from a plurality of software applications and a selection of the compliance standard from a plurality of compliance standards;
wherein identifying the one or more capabilities is based on the received selection of the software application; and
wherein identifying the one or more compliance controls is based on the received selection of the compliance standard.

One or more computer storage media having computer-executable instructions for determining compliance of software applications to compliance standards that, upon execution by a processor, cause the processor to at least:
identify one or more capabilities associated with a software application in a capability data store;
identify one or more compliance controls associated with a compliance standard in a compliance control data store;
map the identified one or more capabilities to the identified one or more compliance controls based on capability map data in the capability data store; and
based on the one or more capabilities being mapped to the one or more compliance controls, provide a positive compliance indicator, whereby compliance of the software application with the compliance standard is confirmed.
wherein mapping the identified one or more capabilities to the identified one or more compliance controls based on capability map data further includes:
identifying a first compliance control of the one or more compliance controls that is related to a second compliance control of the one or more compliance controls based on control relationship data in the compliance control data store, wherein the second compliance control has been mapped to at least one capability of the one or more capabilities; and
mapping the first compliance control to the at least one capability to which the second compliance control is mapped based on the control relationship data.

Any range or device value given herein may be extended or altered without losing the effect sought, as will be apparent to the skilled person.

While no personally identifiable information is tracked by aspects of the disclosure, examples have been described with reference to data monitored and/or collected from the users. In some examples, notice may be provided to the users of the collection of the data (e.g., via a dialog box or preference setting) and users are given the opportunity to give or deny consent for the monitoring and/or collection. The consent may take the form of opt-in consent or opt-out consent.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The embodiments illustrated and described herein as well as embodiments not specifically described herein but within the scope of aspects of the claims constitute exemplary means for identifying one or more capabilities associated with a software application in a capability data store, means for identifying one or more compliance controls associated with a compliance standard in a compliance control data store, means for mapping the identified one or more capabilities to the identified one or more compliance controls based on capability map data in the capability data store, means for providing a positive compliance indicator based on at least one capability of the one or more capabilities being mapped to each compliance control of the one or more compliance controls, whereby compliance of the software application with the compliance standard is confirmed. The illustrated one or more processors 619 together with the computer program code stored in memory 622 constitute exemplary processing means for identifying compliance controls related to mapped compliance controls and mapping capabilities to the related compliance controls as described herein.

The term "comprising" is used in this specification to mean including the feature(s) or act(s) followed thereafter, without excluding the presence of one or more additional features or acts.

In some examples, the operations illustrated in the figures may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system for determining compliance of software applications to compliance standards comprising:
at least one processor; and
at least one memory comprising computer program code, the at least one memory and the computer program code configured to, with the at least one processor, cause the at least one processor to:

identify one or more capabilities associated with a software application in a capability data store;
identify one or more compliance controls associated with a compliance standard in a compliance control data store;
receive, via a user interface, a selection of a level of precision for a compliance report, the level of precision including a high precision and a low precision;
map the identified one or more capabilities to the identified one or more compliance controls based on capability map data in the capability data store and the received selection, wherein upon selection of the low precision for the compliance report, control relationship data is used to identify additional possible matches, the additional possible matches being in addition to the matches identified for a high precision compliance report; and
based on the one or more capabilities being mapped to the one or more compliance controls, provide a positive compliance indicator, whereby compliance of the software application with the compliance standard is confirmed.

2. The system of claim 1, wherein mapping the identified one or more capabilities to the identified one or more compliance controls based on the capability map data further includes:
identifying a first compliance control of the one or more compliance controls that is related to a second compliance control of the one or more compliance controls based on the control relationship data in the compliance control data store, wherein the second compliance control has been mapped to at least one capability of the one or more capabilities; and
mapping the first compliance control to the at least one capability to which the second compliance control is mapped based on the control relationship data.

3. The system of claim 2, wherein the control relationship data indicates the first compliance control and second compliance control have a parent-child relationship indicating that compliance with the second compliance control necessarily indicates compliance with the first compliance control.

4. The system of claim 2, wherein, based on the first compliance control being mapped to the at least one capability based on the control relationship data, update the capability map data of the at least one capability to include a mapping to the first compliance control.

5. The system of claim 2, wherein the control relationship data includes at least one of a truncated sort ID or a truncated genealogy value.

6. The system of claim 1, wherein the at least one memory and the computer program code is configured to, with the at least one processor, further cause the at least one processor to:
based on at least one compliance control of the one or more compliance controls failing to be mapped to at least one capability of the one or more capabilities, provide a negative compliance indicator, whereby non-compliance of the software application with the compliance standard is confirmed.

7. The system of claim 1, wherein the compliance report including at least one first list of compliance controls with which the software application complies and at least one second list of compliance controls with which the software application does not comply.

8. The system of claim 1, wherein identifying one or more capabilities associated with a software application in a capability data store includes identifying, without executing the software application, one or more capabilities associated with a plurality of versions of the software application; and
wherein providing a positive compliance indicator includes providing a positive compliance indicator for each version of the plurality of versions of the software application that complies with the compliance standard.

9. The system of claim 1, wherein the at least one memory and the computer program code is configured to, with the at least one processor, further cause the at least one processor to:
load the compliance report in a tool for deploying the software application; and
use the compliance report to apply configuration settings associated with the capabilities of the compliance report to a baseline installation of the software application.

10. A computerized method for determining compliance of software applications to compliance standards, the method comprising:
identifying, by a processor, one or more capabilities associated with a software application in a capability data store;
identifying, by the processor, one or more compliance controls associated with a compliance standard in a compliance control data store;
receiving, via a user interface, a selection of a level of precision for a compliance report, the level of precision including a high precision and a low precision;
mapping, by the processor, the identified one or more capabilities to the identified one or more compliance controls based on capability map data in the capability data store and the received selection, wherein upon selection of the low precision for the compliance report, control relationship data is used to identify additional possible matches, the additional possible matches being in addition to the matches identified for a high precision compliance report; and
based on the one or more capabilities being mapped to the one or more compliance controls, providing, by the processor, a positive compliance indicator, whereby compliance of the software application with the compliance standard is confirmed.

11. The computerized method of claim 10, wherein mapping the identified one or more capabilities to the identified one or more compliance controls based on the capability map data further includes:
identifying a first compliance control of the one or more compliance controls that is related to a second compliance control of the one or more compliance controls based on the control relationship data in the compliance control data store, wherein the second compliance control has been mapped to at least one capability of the one or more capabilities; and
mapping the first compliance control to the at least one capability to which the second compliance control is mapped based on the control relationship data.

12. The computerized method of claim 11, wherein the control relationship data indicates the first compliance control and second compliance control have a parent-child relationship indicating that software applications that are compliant with the second compliance control are compliant with the first compliance control.

13. The computerized method of claim 11, wherein, based on the first compliance control being mapped to the at least one capability based on the control relationship data, update the capability map data of the at least one capability to include a mapping to the first compliance control.

14. The computerized method of claim 11, wherein the control relationship data includes at least one of a truncated sort ID or a truncated genealogy value.

15. The computerized method of claim 10, further comprising:
based on at least one compliance control of the one or more compliance controls failing to be mapped to at least one capability of the one or more capabilities, providing, by the processor, a negative compliance indicator, whereby non-compliance of the software application with the compliance standard is confirmed.

16. The computerized method of claim 10, wherein the compliance report including at least one first list of compliance controls with which the software application complies and at least one second list of compliance controls with which the software application does not comply.

17. The computerized method of claim 10, wherein identifying one or more capabilities associated with a software application in a capability data store includes identifying one or more capabilities associated with a plurality of versions of the software application; and
wherein providing a positive compliance indicator includes providing a positive compliance indicator for each version of the plurality of versions of the software application that complies with the compliance standard.

18. The computerized method of claim 10, further comprising:
receiving, via the user interface, a selection of the software application from a plurality of software applications and a selection of the compliance standard from a plurality of compliance standards;
wherein identifying the one or more capabilities is based on the received selection of the software application; and
wherein identifying the one or more compliance controls is based on the received selection of the compliance standard.

19. One or more computer storage media having computer-executable instructions for determining compliance of software applications to compliance standards that, upon execution by a processor, cause the processor to at least:
identify one or more capabilities associated with a software application in a capability data store;
identify one or more compliance controls associated with a compliance standard in a compliance control data store;
receive, via a user interface, a selection of a level of precision for a compliance report, the level of precision including a high precision and a low precision;
map the identified one or more capabilities to the identified one or more compliance controls based on capability map data in the capability data store and the received selection, wherein upon selection of the low precision for the compliance report, control relationship data is used to identify additional possible matches, the additional possible matches being in addition to the matches identified for a high precision compliance report; and
based on the one or more capabilities being mapped to the one or more compliance controls, provide a positive compliance indicator, whereby compliance of the software application with the compliance standard is confirmed.

20. The one or more computer storage media of claim 19, wherein mapping the identified one or more capabilities to the identified one or more compliance controls based on capability map data further includes:
identifying a first compliance control of the one or more compliance controls that is related to a second compliance control of the one or more compliance controls based on control relationship data in the compliance control data store, wherein the second compliance control has been mapped to at least one capability of the one or more capabilities; and
mapping the first compliance control to the at least one capability to which the second compliance control is mapped based on the control relationship data.

* * * * *